United States Patent [19]

Ondrasik, II

[11] Patent Number: 4,763,606
[45] Date of Patent: Aug. 16, 1988

[54] MODULAR ANIMAL CAGE

[76] Inventor: Vladimir J. Ondrasik, II, 17044 Westbury Dr., Granada Hills, Calif. 91344

[21] Appl. No.: 934,355

[22] Filed: Nov. 24, 1986

[51] Int. Cl.$^4$ ............................................. A01K 31/00
[52] U.S. Cl. .......................................... 119/17; 119/19
[58] Field of Search ............................ 119/17, 19, 22; 220/331, 332, 329, 19, 1.5, 4 F, 6, 7; 49/382, 193

[56] References Cited

U.S. PATENT DOCUMENTS

| | | | |
|---|---|---|---|
| 329,716 | 11/1885 | Chamberlin | 49/193 |
| 1,120,058 | 12/1914 | Hutto | 119/17 X |
| 1,462,107 | 7/1922 | Holman | 119/17 X |
| 1,964,114 | 6/1934 | Gerlach et al. | 220/326 |
| 2,542,920 | 9/1948 | Gardner | 220/7 |
| 3,037,482 | 6/1962 | Jackson et al. | 119/99 |
| 3,292,582 | 12/1966 | Rubricius | 119/17 |
| 3,429,297 | 1/1967 | Schroer | 119/17 |
| 3,455,061 | 7/1969 | Kesling et al. | 49/382 |
| 3,536,044 | 10/1970 | Stephens et al. | 119/17 |
| 4,120,417 | 10/1978 | Aquino | 220/6 |
| 4,147,276 | 4/1979 | Jordan, Jr. | 220/323 |
| 4,466,676 | 8/1984 | Nilsson | 312/283 |
| 4,475,309 | 10/1984 | Porter | 49/55 |
| 4,503,582 | 3/1985 | Gurubatham | 16/232 |

FOREIGN PATENT DOCUMENTS 53189  1/1912  Fed. Rep. of Germany ......... 220/9

Primary Examiner—Robert Peshock
Assistant Examiner—R. Thomas Price
Attorney, Agent, or Firm—Brown, Martin, Haller & Meador

[57] ABSTRACT

An animal cage comprises an outer frame defining the peripheral edges of a box like enclosure, and a series of wall panels for releasably mounting in respective faces of the enclosure to form spaced side, end, and top and bottom walls of the enclosure. Each panel is held in the surrounding frame by spring loaded latch pins adjacent each end of the frame which are urged into corresponding openings in the frame and can be released at either end for swinging the panel open about the opposite end latch pin, or released at both ends for removing the panel from the frame. The frame is releasably securable to one or more additional frames arranged one on top of the other, side to side, or end to end. The internal wall panels may be removed to increase the height, width or length of the enclosure, or left in place to provide an assembly of separate cages for different animals.

14 Claims, 3 Drawing Sheets

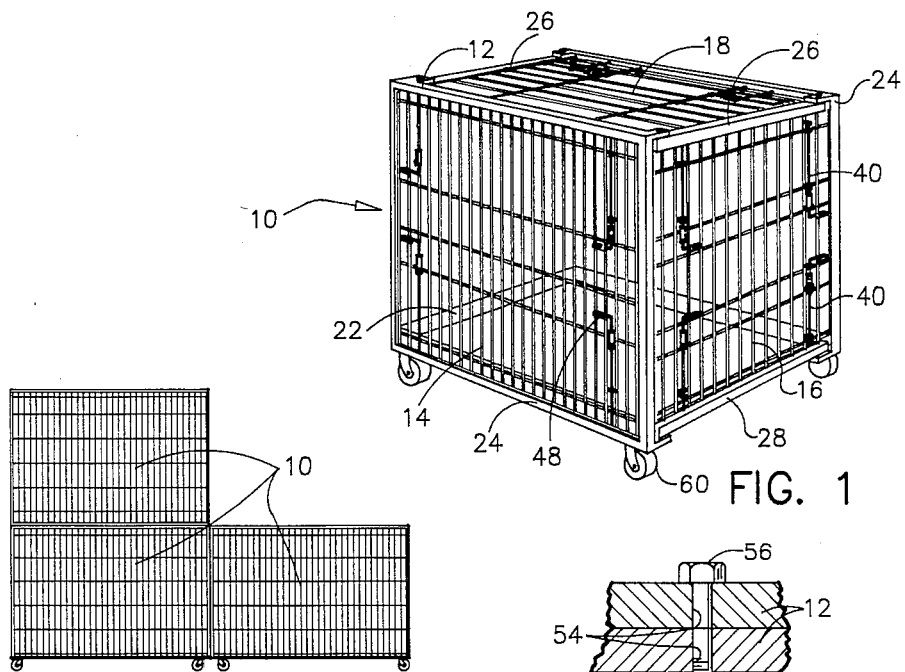
FIG. 1
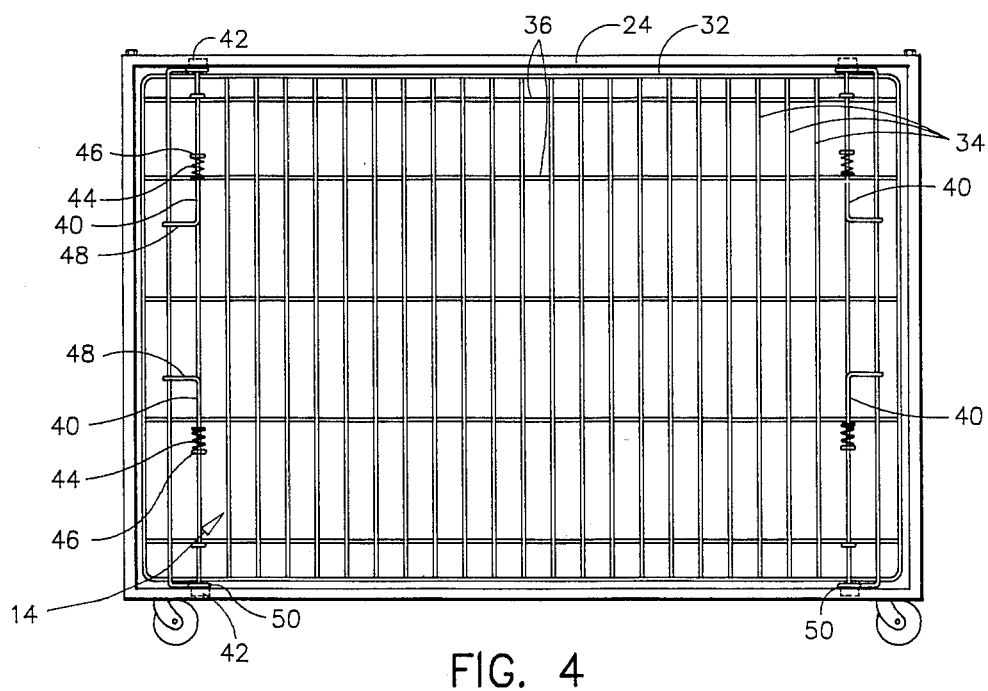
FIG. 2
FIG. 3
FIG. 4

MODULAR ANIMAL CAGE

BACKGROUND OF THE INVENTION

This invention relates generally to animal cages of the type used to retain animals such as pets and the like during transportation, in kennels, pet stores, at animal shows, and so on.

Various types of wire grill panel or other cages have been proposed in the past for retaining animals. In U.S. Pat. No. 3,536,044, for example, a cage for small animals comprises an enclosure of sheet metal panels with a grill work front door hinged to a front opening of the cage. Several such cages can be secured together by brackets for use in retaining animals in separate compartments in kennels, pet stores and the like. The front door can be secured in the opening with the hinges either to the right or the left side of the opening, whichever is most convenient.

Most animal cages in the past have allowed for only one door providing access to the cage, and this can normally only be opened in one direction. This can be a problem in restricted areas, for example during transportation of an animal.

SUMMARY OF THE INVENTION

It is an object of the present invention to provide an improved modular animal cage construction.

According to the present invention an animal cage is provided which comprises an outer frame defining the peripheral edges of a box-like enclosure, and a series of wall panels for mounting in the open faces of the frame to form spaced side, end and top and bottom walls of the cage. Each panel is held in the surrounding frame by means of spring loaded latch pins adjacent two opposite edges of the panel which are urged into aligned openings in the surrounding frame. The panel can be opened by hinging it about either of the latch pins when the opposite edge latch pin is released. Thus the cage can be opened from any convenient direction by releasing the latch pins at one edge of any of the panels. In certain situations, top wall access to the cage may be desirable. In other cases, access from either side or end wall may be more convenient.

Preferably, each panel can be completely removed from the frame by releasing both sets of latch pins. The frame is preferably designed to be securable to one or more additional cage frames of the same construction in end to end, side to side relation or stacked one on top of the other by suitable releasable securing devices such as brackets or bolts. If the resultant internal wall panels are removed, the overall height, length, or width of the enclosure can be increased, for example to accomodate larger animals or to provide increased exercise area for a smaller animal. Alternatively, the internal wall panels may be left in place to provide an assembly of separate cages for different animals, which may be used in kennels, veterinarian's offices, pet stores, and the like.

Preferably, the frame is of collapsible construction so that the frame and panels can be stored flat when not in use. The end frame members may be hinged to the side frame members at each end, for example, to allow the frame to be collapsed in a parallelogram like fashion, or an additional hinge point may be provided at the mid point of each end frame member to allow it to collapse inwardly on itself in a concertina like fashion as the opposite side frame members are flattened against one another. The wall panels may first be removed or hinged inwardly flat against one another.

Preferably, removable caster wheels are provided for releasably mounting at the lower four corners of the cage frame to allow the cage to be pushed easily from one location to another. These wheels can be removed when the cage is to be stacked or left in a fixed location for a period of time.

Thus this modular cage construction allows easy access to an animal from any direction, and allows the size of the cage to be increased or decreased quickly and easily, without purchasing a completely new cage of different dimensions for each different size animal or intended use of the cage. A number of identical modular units can be purchased and secured together in various possible configurations to change the size and shape of an overall enclosure, or to secure separate enclosures together for retaining several animals.

BRIEF DESCRIPTION OF THE DRAWINGS

The present invention will be better understood from the following detailed description of a preferred embodiment of the invention, taken in conjunction with the accompanying drawings, in which like reference numerals refer to like parts, and in which:

FIG. 1 is a perspective view of a modular animal cage according to a preferred embodiment of the present invention;

FIG. 2 is a front elevational view showing several of the modular animal cages secured together;

FIG. 3 is a partial view showing a suitable bolt securing mechanism for securing two cage frames together;

FIG. 4 is a side elevational view of one side wall of the cage of FIG. 1;

DESCRIPTION OF THE PREFERRED EMBODIMENT

Figure 5:
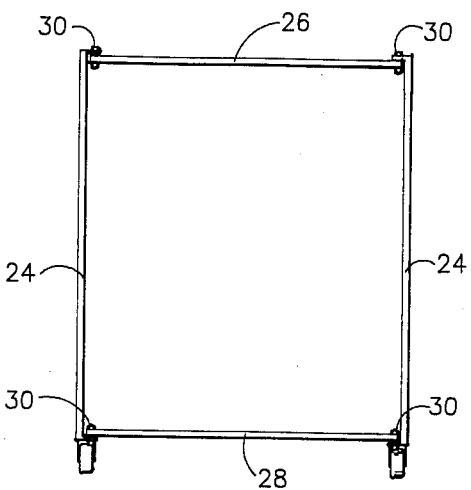
FIG. 5 is an end view of the cage frame with the end wall panel removed.

FIG. 1 of the drawings shows a preferred embodiment of a modular animal cage 10 constructed according to the present invention. As seen in FIG. 1, the cage comprises an outer, rigid frame 12 defining the peripheral edges of a box like enclosure having opposite side, end, and upper and lower open faces, and a series of wall panels of metal grille construction mounted in the open faces of the frame to form the opposite side wall panels 14, end will panels 16 and upper and lower wall panels 18 and 20 (FIG. 7) of the cage. The wall panels may alternatively be of mesh or other constraining material. A suitable tray or pan 22 may be placed on the lower wall of the cage, to contain bedding material and to catch food or debris, for example.

The outer frame is suitably formed from lengths of square section metal tubing of sufficient strength, which may be suitably welded together to form a rigid frame. The frame may, for example, be of steel or equivalent strength metal. In the preferred embodiment shown in FIGS. 1 to 8, the frame is formed from two rigid rectangular frame sections 24 defining the side wall openings of the cage, and upper and lower end frame members 26, 28 at each end of the cage which secure opposite ends of the rectangular frame sections together to define the end wall openings and upper and lower wall openings of the cage.

Figure 8:
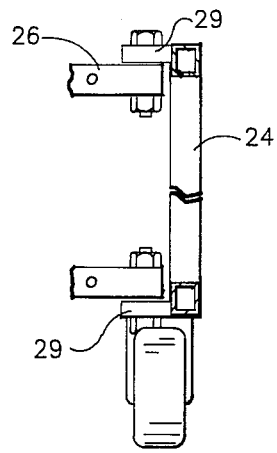
FIG. 8 is a partial cross sectional view on the lines 8—8 of FIG. 3 showing the hinged connection between the end members and side members of the frame.

The end frame members are each pivotally connected at their opposite ends to the rectangular frame sections, as best shown in FIGS. 4, 5 and 8. As shown in FIG. 8, each rectangular frame section has an inwardly projecting flange or extension 29 at its upper and lower edges at each end of the side wall which is in the plane of the end wall. The upper and lower end frame members are pivoted at each end to the respective upper and lower flanges 29 by means of pivot pins 30 which extend through aligned openings in each flange and the respective end of the upper or lower end frame member 26, 28. The end frame members are prevented from pivoting while the cage is in use by the upper and lower wall panels 18 and 20 which will prevent the side walls from collapsing inwardly.

Each wall panel is a wire grille panel dimensioned to fit the appropriate frame opening. The panels consist of a peripheral rectangular or square frame member 32 with a first set of spaced wires 34 extending between two opposite sides of the member 32 and a second set of spaced cross wires 36 extending across the wires 34 and suitably bonded to them by welding, for example, to form a grille having small enough openings to retain an animal of the size to be kept in the cage.

The wall panels are releasably mounted in the respective frame openings by means of opposed pairs of latch pins 40, which are spring loaded into suitable aligned openings in the respective frame members. The latch pins securing one of the side wall panels in the surrounding rectangular frame section are shown in FIG. 4. Two pairs of oppositely directed latch pins are provided, one adjacent each end of the side wall panel. This allows the panel to be opened in either direction, as will be explained in more detail below.

Each latch pin 40 extends slidably through suitable aligned openings in two or more of the panel cross wires, which act as guides. The openings may be formed in suitable enlarged and flattened eyelets in the appropriate cross wires. The pins are arranged to project into suitable aligned openings 42 in the surrounding frame member 24, 26 or 28, respectively, when the panel is mounted in the appropriate wall opening as indicated in FIG. 4. A spring 44 mounted on each latch pin acts between stop 46 on the pin and the adjacent cross member 36 to urge the pin into the aligned frame opening 42 to retain the panel in the wall opening. If desired, suitable padlocks or other locking devices may also be provided for additional security. At their free ends, the pins each have a bent lug or eye portion 48 forming a handle or finger grip for releasing the latch pin. Each aligned pair of pins have their opposing finger grips 48 facing one another and close enough together that they can be gripped between the thumb and fingers of one hand of an operator to urge them towards one another and release them from the opposite openings 42 of the surrounding frame. As indicated in FIG. 4, one of the panel wires 34 extending parallel to latch pins 40 at each end of the panel is preferably extended and bent inwards at each end to form eyes 50 spaced outside the peripheral panel member 32 to receive the ends of the latch pins. This helps to guide and align the latch pins with the appropriate frame openings 42.

Figure 7:
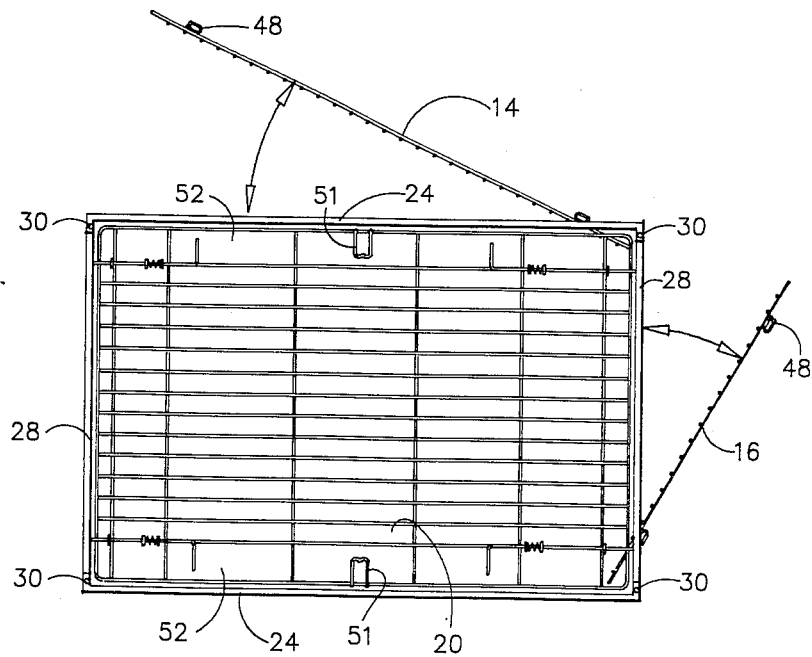
FIG. 7 is a bottom plan view of the cage of FIG. 1 showing a side and an end wall panel hinged open.

The finger grips 48 are preferably sufficiently large to prevent rotation of the latch pin finger grip into the interior of the cage. The lower wall panel 20 is preferably of slightly different construction to the upper wall panel at this respect, since it will not normally be removed or opened while an animal is in cage. Thus the parts of side frame sections 24 surrounding the lower wall opening have pairs of opposed stop lugs 51, as shown in FIG. 7, projecting below the lower wall panel 20 for providing additional support to prevent the panel from being pushed out by the weight of an animal in the cage. The lower wall panel itself has openings 52 surrounding finger grips 48 which are large enough to enable the latch pins to be rotated through 360 degrees, allowing this panel to be opened either from inside or outside the cage.

The side panels and end panels may be raised by suitable lugs or eyelets (not shown) on the lower frame portions to ensure that the lower edges of these panels will be above the level of any tray in the bottom of the cage, so that they can pivot freely in and out.

Figure 6:
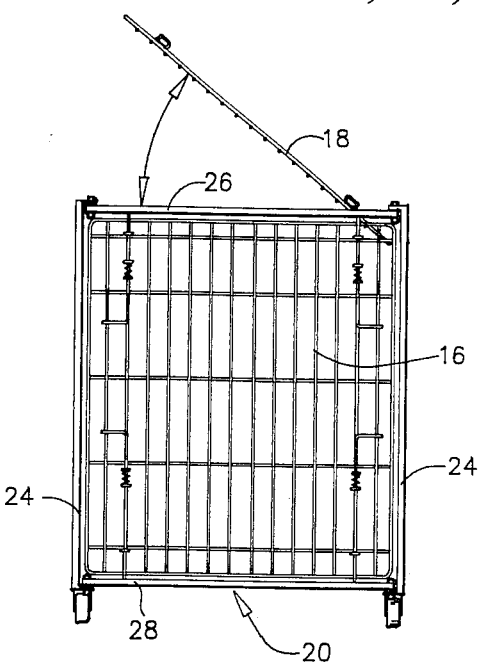
FIG. 6 is a view similar to FIG. 5 with the end wall panel in place and showing a top wall panel hinged upwardly to open the top face of the frame.

With this arrangement, the cage 10 can be accessed from any direction, and any of the wall panels can be opened in either direction or completely removed as desired. For example, if one of the side walls 14 is to be opened, the operator or animal handler simply releases the pair of latch pins at the appropriate end of the side wall by gripping the finger grips 48 and urging them together until the pins are released from the frame openings 42. At this point, the panel 14 can be hinged or pivoted outwardly about the latch pins 40 at the opposite end of the wall, as indicated in FIG. 7. Clearly, the panel 14 could be opened in the opposite direction if desired by releasing the pins only at the opposite end of the wall to that shown in FIG. 7. End walls 16 can be opened either way in an equivalent fashion, as indicated in FIG. 7, and top wall panel 18 can be opened in the same way as shown in FIG. 6. The bottom wall panel 20 can also be pivoted about either pair of hinge pins in the same manner, but this is normally only done prior to storage of the cage, as described below in connection with FIGS. 9 and 10.

Any, or all, of the wall panels may be provided with additional smaller door sections which can be pivoted open relative to the remainder of the wall panel, if desired. Thus, when the cage is in a confined space, for example, access to the cage is available from any direction according to which particular wall panel happens to be most accessible. With some animals, it may be safer to access the cage from the top unless the animal is to be removed from the cage. Any of the side, end and top wall panels can be utilized as a door as is most convenient for the handler. This is particularly useful during transportation of animals, when space is likely to be confined and thus only one wall of the cage may be accessible in certain situations.

Instead of having the latch pins arranged vertically to open the side and end wall panels to one side, as shown in the drawings, they may alternatively be oriented at 90 degrees to the direction shown to allow these panels to be opened upwardly or downwardly. Similarly, the upper and lower wall latch pins may be rotated through 90 degrees. To completely remove a panel from its respective wall opening, all that is required is to release the pairs of latch pins at each end of the panel. This may be done simultaneously using the thumb and fingers of each hand to grip and squeeze together the finger grips of the latch pins at each end of the panel.

Preferably, the cage is of a modular construction including suitable attachment devices for securing the frames of two or more such cages together either side to side, end to end, or stacked one on top of the other, as shown in FIGS. 2 and 3. A suitable attachment device for securing two cages together is shown in FIG. 3. The side and end frame members 24, 26, 28 of each cage are provided with suitable openings 54 in appropriate positions for alignment with corresponding openings in another cage when the two cages are placed in an appropriate face to face relationship. This may comprise side race to side face, end to end face, or lower face to upper. In the arrangement shown in FIG. 3, one such aligned pair of openings 54 in the frame 12 of two adjacent cages in shown with a suitable bolt 56 projecting through the openings having a lock nut 58 on its free end for releasably locking the two frame members together. In alternative arrangements, locking brackets or similar devices may be used to lock the two adjacent frame members together.

When two or more cage frames are secured together in this fashion, for example as shown in FIG. 2, the resultant internal wall panels may be left in place to form an assembly of separate cages for different animals, or the internal will panels may be removed to enlarge the cage, for example for larger animals or to provide more exercise area. The length, width or height of an overall cage can thus be increased quickly and easily using a plurality of modular cage units, and it will not be necessary to purchase new cages of larger dimensions each time a different size or shape of cage is needed. All that will be required will be a number of the modular cages 10 of fixed dimensions, which may be stored when not in use and secured together in the desired configuration as needed. This wiil be significantly less expensive and more convenient than the purchase of individual, different dimension cages. When travelling, for example, the smallest dimension of cage interior will normally be utilized. On arrival, a larger cage interior can be provided for exercise in a quick and easy manner, without needing to remove the animal from the cage.

According to another preferred feature, the modular cage 10 is provided with removable caster wheels 60 at the four lower corners of the frame 12. These may screw or snap into appropriate openings in the frame, for example, when the cage is to be moved from one location to another, and may be removed when the cage is to be stacked on another cage, transported in a vehicle, or remain in one place for an extended period of time. A grooming tray (not shown) may also be provided for securing on top of the cage by suitable bolts for grooming of animals at shows, for example. Appropriate screw threaded bores may be provided at the upper four corners of the frame for this purpose.

The cage 10 is preferably collapsible for storage. In the embodiment shown in FIGS. 1 to 8, the cage frame 12 is collapsible in parallelogram like fashion about pivot pins 30 once the upper and lower walls have been pivoted into the interior of the cage into face to face engagement with the opposite side wall panels. A tray 22 may also be stored behind the opposite side wall panels.

Figure 10:
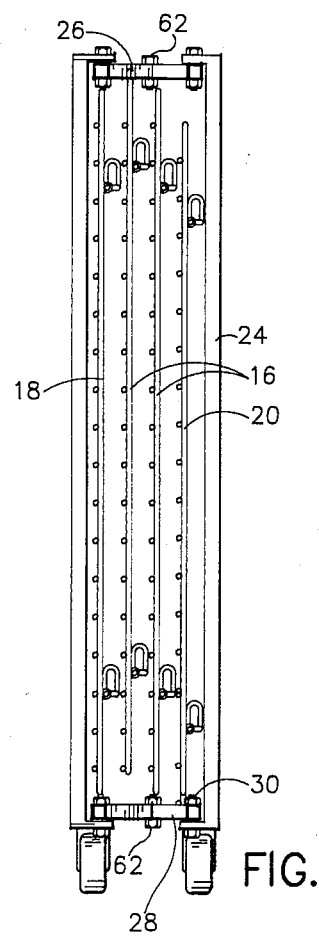
FIG. 10 is an end view of a collapsed cage frame with the end wall panels and upper and lower panels hinged inwardly against the side wall panels for storage within the collapsed frame.
Figure 9:
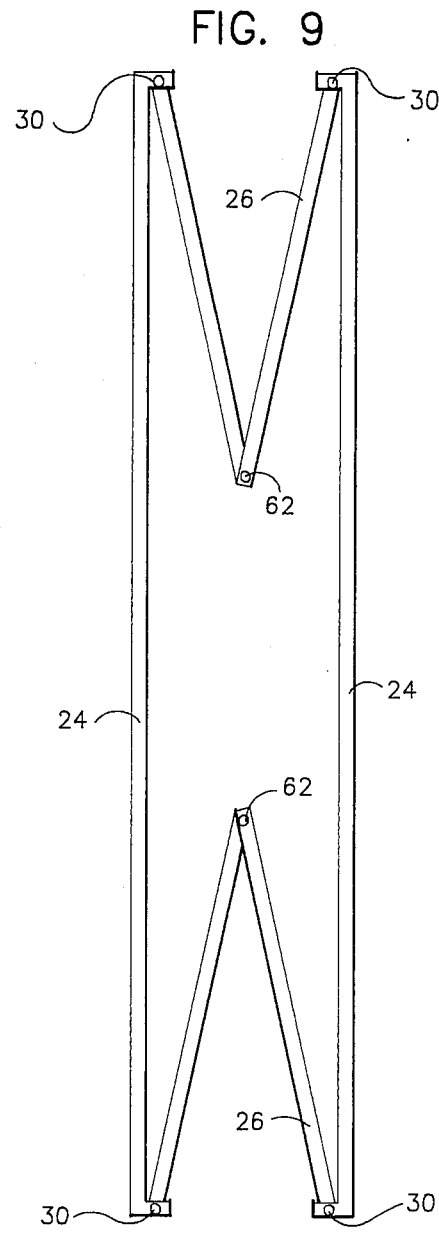
FIG. 9 is an end view of a modified cage having an additional hinge in the center of each end member to allow the cage frame to collapse inwardly.

FIGS. 9 and 10 show a modification in which the cage frame is collapsible in a more compact, concertina like fashion. In this arrangement, each of the upper and lower end frame members 26 and 28 has a central pivot 62. To collapse the cage, the upper, lower and end wall panels must first be pivoted inwardly about appropriate pairs of latch pins to lie flat against one another as shown in FIG. 10. The side frame sections can then be pushed inwardly towards one another as indicated in FIG. 9, collapsing each end member about pivots 30 and 62 as shown. This procedure is reversed to reassemble the cage.

Although in the preferred embodiment illustrated, the frame comprises solid rectangular side wall sections connected together by pivoted end frame members, the side wall sections 24 may alternatively be arranged to define the top and bottom wall openings, with the end frame members connecting these openings to form the side and end wall openings. The frame would then collapse downwardly in an equivalent fashion when the side walls have been pivoted inwardly. In another alternative, the end wall openings may be defined by continuous square or rectangular frame sections joined together by spaced upper and lower side wall frame members which would be pivoted to the end wall frame sections in an equivalent manner.

Thus the modular animal cage 10 allows any panel wall to be utilized as a door as is most convenient at any time, allows walls to be removed completely when necessary for example for cage expansion, cage storage, or increased access to the cage interior, and allows the cage to be collapsed flat for storage. The cage can be secured to any number of other cages in any desired configuration quickly and easily to provide an assembly of separate cages or an enlarged individual cage for larger animals or more exercise area. Thus this cage construction is extremely versatile, and allows a single, modular type of cage to be purchased for various different types of users, include transportation of animals, displaying of animals, confined exercise of animals, animal shows, pet shops, veterinarian's offices, kennels, and so on, significantly reducing the overall cost of purchasing separate cages for each different cage use.

Although a preferred embodiment of the present invention has been described above by way of example only, it will be understood by those skilled in the field that modifications may be made to the disclosed embodiment without departing from the scope of the invention which is defined by the appended claims.

I claim:
1. An animal cage, comprising:
an outer frame defining the peripheral edges of a box like enclosure having opposite open side, end and upper and lower faces;
a series of wall panels for mounting in the open faces of the frame to form the opposite side, end, and upper and lower walls of the cage;
hinge latch means for releasably securing each panel adjacent two opposite edges to the surrounding frame at a respective cage face; each latch means comprising means for hingeably securing the respective edge of the panel to the frame and for allowing the panel to pivot about the hinge latch means when the opposite edge latch means is released, the frame surrounding each wall opening having aligned latch openings for slidably receiving respective panel latch means.

2. The cage of claim 1, wherein said latch means comprises opposed pairs of latch pins and means for urging each latch pin towards a projecting position in which it projects from the edge of the wall panel, each latch pin facing in the opposite direction to the other latch pin of that pair, and the latch openings comprising corresponding opposed pairs of openings in the frame surrounding each wall opening.

3. The cage of claim 2, wherein each wall is of wire grill construction comprising a rectangular wire member defining the periphery of the panel, a first set of spaced parallel wires extending between opposite edges of the rectangular member, and a second set of spaced cross wires extending traversely across the first set of wires, at least some of the cross wires having aligned openings for receiving and guiding the latch pins.

4. The cage of claim 1, including releasable securing means for securing the frame to the frame of an identical cage in any chosen orientation including end to end, face to face, and top to bottom.

5. The cage of claim 1, in which the cage frame is collapsible for storage.

6. The cage of claim 1, in which the cage frame includes two rectangular side frame portions for defining the cage side wall openings and spaced pairs of end frame members connecting the four corners of each side frame portion to the corresponding corners of the other side frame portion to define the upper, lower and end wall openings of the cage.

7. The cage of claim 6, wherein the end frame members are pivotally connected to the respective side frame portion corners, the pivotal connection comprising means for allowing the cage frame to collapse for storage.

8. The cage of claim 1, including caster wheels and means for releasably securing the caster wheels to the lower four corners of the cage.

9. A modular animal cage assembly, comprising a plurality of modular cage units and means for releasably securing the cage units together in any chosen configuration including end to end, side to side, and top to bottom, each cage unit comprising an outer frame defining the outer peripheral edges of a box-like enclosure having side, end, upper and lower wall openings, and six wall panels for releasably mounting in the respective wall openings of the frame for forming the respective side, end, upper and lower walls of the cage, the means for releasably securing the cage units together comprising securing means for connecting the frame of one cage to adjacent frame portions of a cage placed face to face with that cage in any chosen configuration.

10. An animal cage, comprising:
an outer frame defining the peripheral edges of a box like enclosure having opposite open side, end and upper and lower faces;
a series of wall panels for mounting in the open faces of the frame to form the opposite side, end, and upper and lower walls of the cage;
hinge latch means for releasably securing each panel adjacent two opposite edges to the surrounding frame at a respective cage face; each latch means comprising means for hingeably securing the respective edge of the panel to the frame and for allowing the panel to pivot about the hinge latch means when the opposite edge latch means is released, the frame surrounding each wall opening having aligned latch openings for slidably receiving respective panel latch means;
two rectangular side frame portions for defining the cage side wall openings and spaced pairs of end frame members connecting the four corners of each side frame portion to the corresponding corners of the other side frame portion to define the upper, lower and end wall openings of the cage, the end frame members being pivotally connected to the respective side frame portion corners and each end frame member having a central pivot for allowing the cage frame to collapse for storage.

11. The cage of claim 10, wherein said latch means comprises opposed pairs of latch pins and means for urging each latch pin towards a projecting position in which it projects from the edge of the wall panel, each latch pin facing in the opposite direction of the other latch pin of that pair, and the latch openings comprising corresponding opposed pairs of openings in the frame surrounding each wall opening.

12. The cage of claim 11, wherein each wall is of wire grill construction comprising a rectangular wire member defining the periphery of the panel, a first set of spaced parallel wires extending between opposite edges of the rectangular member, and a second set of spaced cross wires extending traversely across the first set of wires, at least some of the cross wires having aligned openings for receiving and guiding the latch pins.

13. The cage of claim 10, including releaseable securing means for securing the frame to the frame of an identical cage in any chosen orientation including end to end, face to face, and top to bottom.

14. The cage of claim 10, including caster wheels and means for releasably securing the caster wheels to the lower four corners of the cage.

* * * * *